(12) United States Patent
Hirata

(10) Patent No.: US 7,452,397 B2
(45) Date of Patent: Nov. 18, 2008

(54) FILTRATION MEMBER FOR INFLATOR AND METHOD OF MANUFACTURING THE SAME

(75) Inventor: Yuichi Hirata, Aichi-ken (JP)

(73) Assignee: Chuo Hatsujo Kabushiki Kaisha (JP)

( * ) Notice: Subject to any disclaimer, the term of this patent is extended or adjusted under 35 U.S.C. 154(b) by 266 days.

(21) Appl. No.: 10/596,524

(22) PCT Filed: Jan. 27, 2005

(86) PCT No.: PCT/JP2005/001062

§ 371 (c)(1),
(2), (4) Date: Jun. 15, 2006

(87) PCT Pub. No.: WO2005/073036

PCT Pub. Date: Aug. 11, 2005

(65) Prior Publication Data

US 2007/0193235 A1    Aug. 23, 2007

(30) Foreign Application Priority Data

Jan. 29, 2004    (JP) .............................. 2004-021815

(51) Int. Cl.
*B01D 39/10* (2006.01)
*B60R 21/26* (2006.01)
(52) U.S. Cl. .................. 55/525; 55/487; 55/DIG. 5; 55/385.3; 280/740; 280/742
(58) Field of Classification Search ................ 55/385.1, 55/385.3, 525, 526, 486, 487, DIG. 5; 280/728.1, 280/736, 740, 742; 29/896.62
See application file for complete search history.

(56) References Cited

U.S. PATENT DOCUMENTS

| 5,215,721 | A | * | 6/1993 | Tasaki et al. ................. 422/165 |
| 5,665,131 | A | * | 9/1997 | Hock et al. .................... 55/487 |
| 5,855,635 | A | * | 1/1999 | Rice ............................ 55/486 |
| 6,135,496 | A | * | 10/2000 | Katsuda et al. ............. 280/736 |
| 6,183,006 | B1 | * | 2/2001 | Katsuda et al. ............. 280/736 |
| 6,196,581 | B1 | * | 3/2001 | Katsuda et al. ............. 280/736 |
| 6,224,096 | B1 | * | 5/2001 | Katsuda et al. ............. 280/736 |
| 6,234,521 | B1 | * | 5/2001 | Katsuda et al. ............. 280/736 |
| 6,386,582 | B2 | * | 5/2002 | Katsuda et al. ............. 280/736 |
| 6,406,060 | B1 | * | 6/2002 | Katsuda et al. ............. 280/736 |

(Continued)

FOREIGN PATENT DOCUMENTS

EP    1 593 420 A1    11/2005

(Continued)

*Primary Examiner*—Duane Smith
*Assistant Examiner*—Robert A Clemente
(74) *Attorney, Agent, or Firm*—Akerman Senterfitt

(57) ABSTRACT

A filter (15) for an inflator, comprising a cylindrical body (15a) formed by winding wires (16) therearound. The cylindrical body (15a) further comprises an inner peripheral part (21) and an outer peripheral part (22) covering the outer peripheral surface of the inner peripheral part (21). The inner peripheral part (21) is formed by radially stacking a plurality of first pattern layers (18a) thereon. The outer peripheral part (22) is formed by radially stacking one or more second pattern layers (18a) on the outer peripheral surface of the inner peripheral part (21). The first and second pattern layers (18a) and (18b) are formed of the wires (16) in net shapes. The mesh of the second pattern layers (18b) is smaller than that of the first pattern layer (18a).

19 Claims, 3 Drawing Sheets

U.S. PATENT DOCUMENTS

| | | | |
|---|---|---|---|
| 6,409,214 B2 * | 6/2002 | Katsuda et al. | 280/741 |
| 6,695,345 B2 * | 2/2004 | Katsuda et al. | 280/736 |
| 2003/0010247 A1 | 1/2003 | Miyaji et al. | |
| 2007/0214768 A1 * | 9/2007 | Koyama et al. | 60/243 |

FOREIGN PATENT DOCUMENTS

| | | |
|---|---|---|
| EP | 1 707 451 A1 | 10/2006 |
| JP | 11-348712 | 12/1999 |
| JP | 2001-171472 A | 6/2001 |
| JP | 2001-171473 A | 6/2001 |
| JP | 2001-301561 A | 10/2001 |
| JP | 2002-306914 A | 10/2002 |

* cited by examiner

FILTRATION MEMBER FOR INFLATOR AND METHOD OF MANUFACTURING THE SAME

FIELD OF THE INVENTION

The present invention relates to an inflator filter member that is attached to an inflator for an air bag apparatus, and a manufacturing method for the inflator filter member.

BACKGROUND OF THE INVENTION

A typical vehicle is equipped with an air bag apparatus. An air bag apparatus instantaneously inflates a bag by releasing gas into the bag when the vehicle suddenly decelerates, such as in the event of a collision. The air bag apparatus includes an inflator, which functions to instantaneously release gas, and a bag, which is inflated by the gas released from the inflator to protect a vehicle occupant. The inflator includes an igniter for generating heat, a gas generation composition that burns explosively due to the heat from the igniter in order to generate gas, and an inflator filter for filtering and cooling the generated gas. The inflator filter filters and cools the high-temperature gas, which contains residues.

As such an inflator filter, a filter obtained by compressing and shaping a knit mesh net that is knitted in stockinet or a filter obtained by rolling a flat-woven net into a layered cylinder has been proposed in the prior art. However, such an inflator filter is manufactured by preparing a long net for a plurality of layers and then superimposing the net into layers or rolling the net into layers. Thus, the manufacture of the filter is troublesome.

Accordingly, winding filters are now mainly used as inflator filter members (refer to, for example, Japanese Laid-Open Patent Publication No. 11-348712). A winding filter is obtained by directly knitting a metal wire, which is a deformed wire having a circular or square cross-section, into a cylindrical body having meshes.

The diameter of wire used for such a winding filter tends to be set large to withstand the temperature and pressure of the gas that passes through the filter. Further, the meshes of the filter tend to be set large to reduce pressure loss of the gas that passes through the winding filter. However, when the winding filter with such settings is applied to an air bag apparatus that is designed to generate a large amount of gas, such as an air bag apparatus for a front passenger seat of an automobile, the amount of gas may exceed the capture capability of the filter. As a result, the filter may fail to capture residues contained in the gas.

SUMMARY OF THE INVENTION

It is an object of the present invention to provide an inflator filter member that does not increase pressure loss even when a large amount of high-temperature, high-pressure gas is generated and has superior capability for capturing residues contained in the gas. It is another object of the present invention to provide a manufacturing method for the inflator filter member.

One aspect of the present invention of an inflator filter member, including a cylindrical body formed by winding a wire, for filtering and cooling gas by having the gas pass through the inflator filter member from a radially inner side toward a radially outer side. The cylindrical body includes a cylindrical inner circumferential portion and a cylindrical outer circumferential portion covering an outer circumferential surface of the inner circumferential portion. The inner circumferential portion is formed by superimposing a plurality of first pattern layers in the radial direction, and the outer circumferential portion is formed by superimposing one or more second pattern layers in the radial direction on the outer circumferential surface of the inner circumferential portion. The first pattern layers and the second pattern layers are each formed from the wire to have a mesh. The mesh of each second pattern layer is smaller than the mesh of each first pattern layer.

Another aspect of the present invention is an inflator filter member, including a cylindrical body formed by winding a wire, for filtering and cooling gas by having the gas pass through the inflator filter member from a radially inner side toward a radially outer side. The cylindrical body includes a cylindrical inner circumferential portion and a cylindrical outer circumferential portion covering an outer circumferential surface of the inner circumferential portion. The inner circumferential portion is formed by superimposing a plurality of first pattern layers in the radial direction, and the outer circumferential portion is formed by superimposing one or more second pattern layers in the radial direction on the outer circumferential surface of the inner circumferential portion. Each of the first pattern layers is formed from the wire to have a mesh, and each of the second pattern layers is formed with the wire. The wire in each of the second patterns has a density that is greater than that of the wire in the first pattern layers.

A further aspect of the present invention is a method for manufacturing an inflator filter member formed by a cylindrical body including a cylindrical inner circumferential portion and a cylindrical outer circumferential portion covering an outer circumferential surface of the inner circumferential portion. The method includes a first step for forming the inner circumferential portion and a second step for forming the outer circumferential portion. The first step winds a wire around an outer circumferential surface of a shaft member to form a first pattern layer having a mesh and superimposes a plurality of the first pattern layers in the radial direction of the shaft member. The second step winds the wire around the outer circumferential surface of the inner circumferential portion that is formed in the first step so as to superimpose on the outer circumferential surface of the inner circumferential portion a second pattern layer having a mesh that is smaller than the mesh of each first pattern layer.

Another aspect of the present invention is a method for manufacturing an inflator filter member formed by a cylindrical body including a cylindrical inner circumferential portion and a cylindrical outer circumferential portion covering an outer circumferential surface of the inner circumferential portion. The method includes a first step for forming the inner circumferential portion and a second step for forming the outer circumferential portion. The first step winds a wire wound around an outer circumferential surface of a shaft member to form a first pattern layer having a mesh on the outer circumferential surface of the shaft member and superimposes a plurality of the first pattern layer in the radial direction of the shaft member. The second step winds the wire around the outer circumferential surface of the inner circumferential portion formed in the first step so as to superimpose on the outer circumferential surface of the inner circumferential portion a second pattern layer in which the wire has a density that is greater than that of the wire in the first pattern layer.

DETAILED DESCRIPTION OF THE PREFERED EMBODIMENTS

An inflator filter member that is attached to an inflator of an air bag apparatus and a manufacturing method for the inflator filter member according to a preferred embodiment of the present invention will now be described with reference to the drawings.

Figure 1:
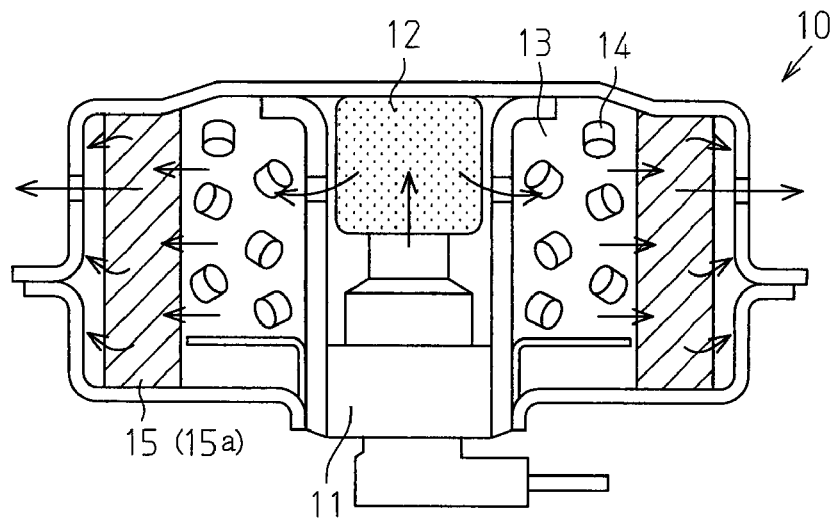
FIG. 1 is a cross-sectional view of an inflator according to a preferred embodiment of the present invention.

As shown in FIG. 1, an inflator 10 of the air bag apparatus (not shown) of the present embodiment has, at its central portion, an igniter 11, which is ignited by an activation signal from a sensor (not shown), and a combustion aid substance 12, which is combustible. The combustion aid substance 12 is ignited by the igniter 11 and aids heat generation. A chamber 13, into which the heat generated by the igniter 11 and the combustion aid substance 12 enters, is arranged around the outer circumferences of the igniter 11 and the combustion aid substance 12. A gas generation composition 14 is accommodated in the chamber 13. The gas generation composition 14, which burns explosively due to the heat generated by the activation of the igniter 11 and the combustion aid substance 12, generates a large amount of gas. The generated gas is supplied into a bag (not shown), which is arranged in the air bag apparatus together with the inflator 10.

A filter 15, which serves as an inflator filter member, is arranged to surround the chamber 13 in the inflator 10. The filter 15 is provided with a cooling function for cooling high-temperature gas generated by the gas generation composition 14 and a filtering function for filtering out residues from the gas. In FIG. 1, the arrows show the direction in which the generated gas flows.

The filter 15 will now be described in detail.

The filter 15 is manufactured by first winding a metal wire 16, which is a deformed wire such as a round wire or a rectangular wire, around a cylindrical bobbin 19 (refer to FIG. 6), which serves as a shaft member, and then removing the bobbin 19. The filter 15 is formed as a cylindrical body 15a having meshes. The winding type cylindrical body 15a of the present embodiment uses a steel wire, which is mainly composed of iron, as the wire 16 and is formed into a cylinder having an outer diameter of 57 mm and an inner diameter of 45 mm by winding the wire 16 five hundred times around the outer circumferential surface of the bobbin 19. The wire 16 is a flat wire having a rectangular cross-section and has a vertical width of 0.35 mm and a horizontal width of 0.6 mm. The thickness of the wire 16 in the present embodiment refers to the vertical width of the wire 16.

Figure 2:
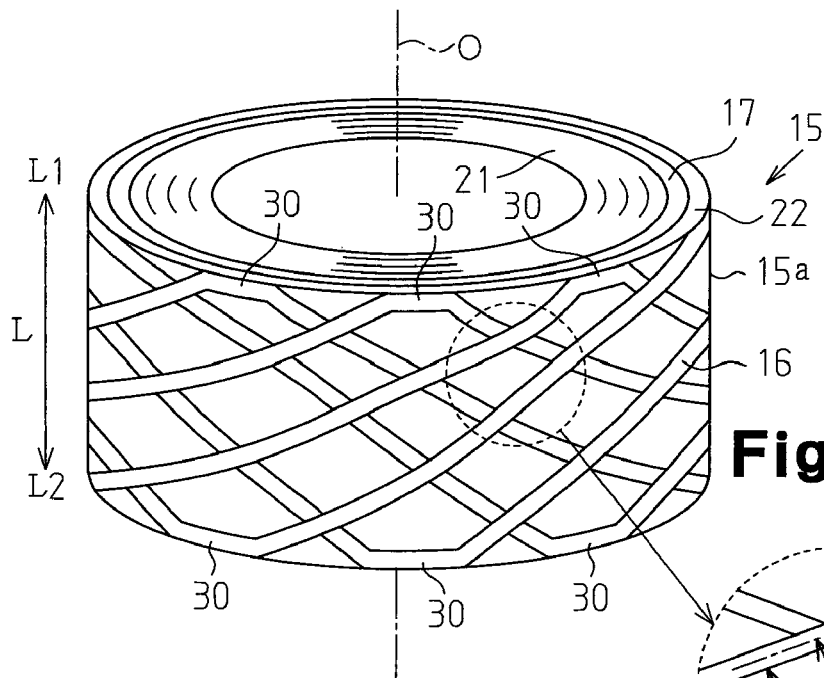
FIG. 2(a) is a perspective view of a filter.
FIG. 2(b) is a partially enlarged view of the filter.
Figure 2:
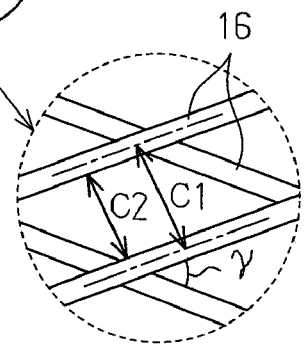
Figure 3:
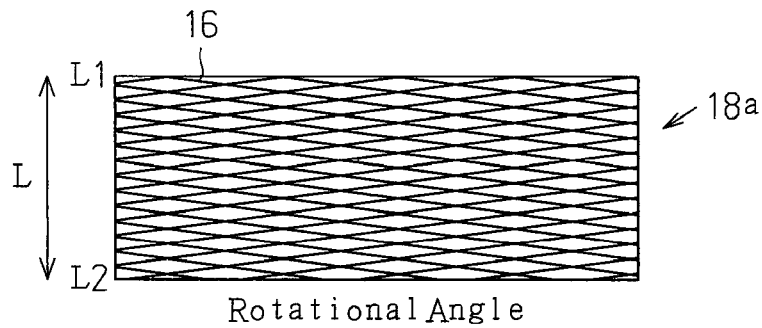
FIG. 3(a) is a schematic view showing a first pattern layer.
FIG. 3(b) is a schematic view showing a second pattern layer.
Figure 3:
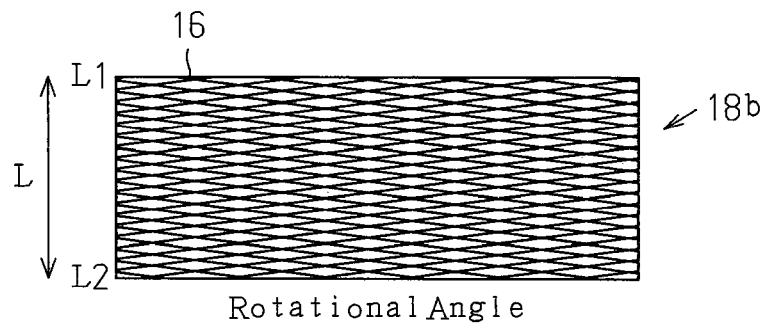

When the wire 16 is wound around the outer circumference of the bobbin 19, the wire 16 is crossed to form a pattern layer 18 including a plurality of diamond meshes as shown in FIG. 2(a) and FIGS. 3(a) and 3(b). The wire 16 is wound around the outer circumferential surface of the bobbin 19 in a manner that a plurality of such pattern layers 18 are superimposed in the radial direction. The high-temperature, high-pressure gas generated by the gas generation composition 14 passes through gaps in the meshes of the pattern layers 18. When passing through the pattern layers 18, the gas is cooled and residues are filtered out of the gas. The crossing parts of the wire 16 are bonded together by heat treatment, such as sintering. In each pattern layer 18, the interval between adjacent windings of the wire 16 is referred to as a mesh pitch C1, the gap formed in the meshes is referred to as a gap pitch C2, an angle at which the crossing parts of the wire 16 intersect each other is referred to as an intersecting angle γ, and winding width of the wire 16 in the axial direction of the bobbin 19 is referred to as winding width L (refer to FIGS. 2(a) and 2(b)).

Figure 4:
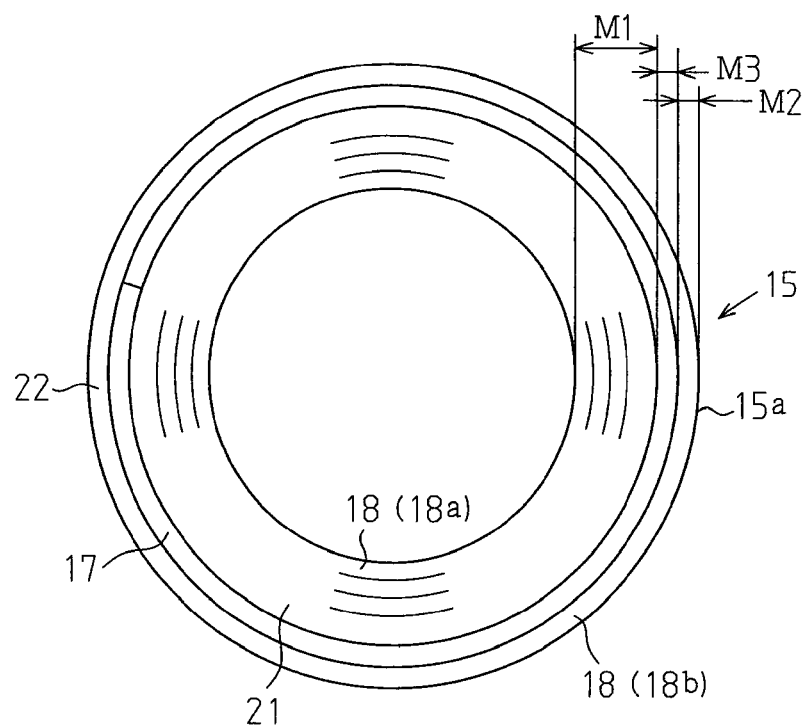
FIG. 4 is a plan view of the filter as viewed in the axial direction of a bobbin.

As shown in FIG. 2(a) and FIG. 4, a porous ceramic paper 17, serving as a sheet filter member, is rolled between pattern layers 18 that are adjacent in the radial direction wrapped at a radially middle position of the filter (cylindrical body 15a). The ceramic paper 17 is formed to have pores that are finer than the meshes formed by crossing the wire 16 (i.e., the meshes of each pattern layer 18). Thus, the ceramic paper 17 has a higher residue capture capability than the pattern layers 18. Hereafter, the portion of the filter 15 located at an inner side of the ceramic paper 17 in the radial direction is referred to as an inner circumferential portion 21, and the portion of the filter 15 located at an outer side of the ceramic paper 17 in the radial direction is referred to as an outer circumferential portion 22. Further, the pattern layers 18 in the inner circumferential portion 21 are referred to as first pattern layers 18a, and the pattern layers 18 in the outer circumferential portion 22 are referred to as second pattern layers 18b. In other words, in the present embodiment, the ceramic paper 17 is arranged to cover an outer circumferential surface of the cylindrical inner circumferential portion 21 formed by the first pattern layers 18a, and the cylindrical outer circumferential portion 22 is formed by the second pattern layers 18b arranged to cover an outer circumferential surface of the ceramic paper 17.

The thickness M1 of the inner circumferential portion 21 in the radial direction is set in a manner that the high-temperature, high-pressure gas generated in the chamber 13 is sufficiently cooled when the gas passes through the inner circumferential portion 21. In detail, the thickness M1 is set so that liquid residues contained in the gas generated in the chamber 13 are sufficiently cooled and so that the liquid residues are solidified when the gas passes through the inner circumferential portion 21.

The thickness M2 of the outer circumferential portion 22 is set to be slightly less than the thickness M1 of the inner circumferential portion 21 to reduce pressure loss that occurs when the gas passes through the outer circumferential portion 22. More specifically, the number of pattern layers 18 in the outer circumferential portion 22 is less than the number of pattern layers 18 in the inner circumferential portion 21. In the present embodiment, the outer circumferential portion 22 is formed by a single second pattern layer 18b. In the same manner, the thickness M3 of the ceramic paper 17 is set to be much less than the thickness M1 of the inner circumferential portion 21 to reduce pressure loss occurring when the gas passes through the ceramic paper 17. In the present embodiment, the thickness M1 of the inner circumferential portion 21 in the radial direction is set at 5 mm, the thickness M2 of the outer circumferential portion 22 in the radial direction is set at 0.7 mm, and the thickness of the ceramic paper 17 in the radial direction is set at 0.3 mm as shown in Table 1.

TABLE 1

|  | Inner Diam. (mm) | Outer Diam. (mm) | Mesh Pitch (mm) | Bulk Specific Gravity (g/cm³) | Thickness (mm) |
|---|---|---|---|---|---|
| Specification of Inner Circumferential Portion | 45 | 55 | 1.3 (*0.7) | 3.5 | 5 |
| Ceramic Sheet | 55 | 55.6 | — | — | 0.3 |
| Specification of Outer Circumferential Portion | 55.6 | 57 | 0.9 (*0.3) | 5.5 | 0.7 | dimension marked by * is gap pitch

As shown in FIGS. 3(a) and 3(b), the meshes of each first pattern layer 18a in the inner circumferential portion 21 are formed to be larger than the meshes of the second pattern layer 18b in the outer circumferential portion 22. More specifically, the material, thickness, and shape of the wire 16 forming the inner circumferential portion 21 are the same as those of the wire 16 forming the outer circumferential portion 22 in the present embodiment. Thus, the first pattern layers 18a and the second pattern layer 18b are formed in a manner that the density of the wire 16 is less in the first pattern layers 18a than in the second pattern layer 18b (the bulk specific gravity of the inner circumferential portion 21 is less than the bulk specific gravity of the outer circumferential portion 22). In more detail, the inner circumferential portion 21 has larger gaps (i.e., larger meshes) to minimize the pressure loss of the gas that passes through the inner circumferential portion 21.

The outer circumferential portion 22 has strength enabling the shape of the filter 15 to be maintained. Thus, the outer circumferential portion 22 receives the pressure applied to the ceramic paper 17, which has fine pores, when the gas passes through the ceramic paper 17. More specifically, each second pattern layer 18b forming the outer circumferential portion 22 has a large number of small meshes to increase contacting points (that is, bonded points) of the wire 16 per unit area. The contacting points are bonded by performing, for example, sintering as described above. Thus, the strength of the outer circumferential portion 22 is easily improved by increasing the number of contacting points (contact area).

In the present embodiment, the mesh pitch C1 is set at 1.3 mm and the gap pitch C2 is set at 0.7 mm in the inner circumferential portion 21, and the mesh pitch C1 is set at 0.9 mm and the gap pitch C2 is set at 0.3 mm in the outer circumferential portion 22 as shown in Table 1. Further, the bulk specific gravity of the inner circumferential portion 21 is 3.5 g/cm³, and the bulk specific gravity of the outer circumferential portion 22 is 5.5 g/cm³. To reduce the pressure loss in the gas passing through the inner circumferential portion, the first pattern layers 18a forming the inner circumferential portion 21 are arranged in a manner that the meshes of each first pattern layer 18a coincide in the circumferential direction and the axial direction with the meshes of an adjacent first pattern layer 18a in the radial direction.

Figure 5A:
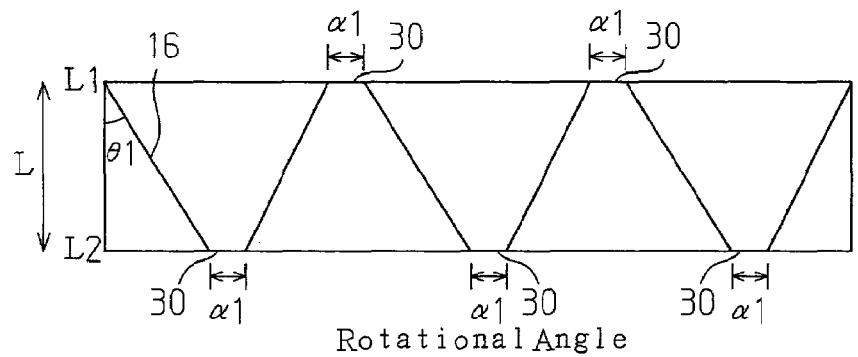
FIG. 5(a) is a diagram showing a method for forming the first pattern layer.
Figure 5B:
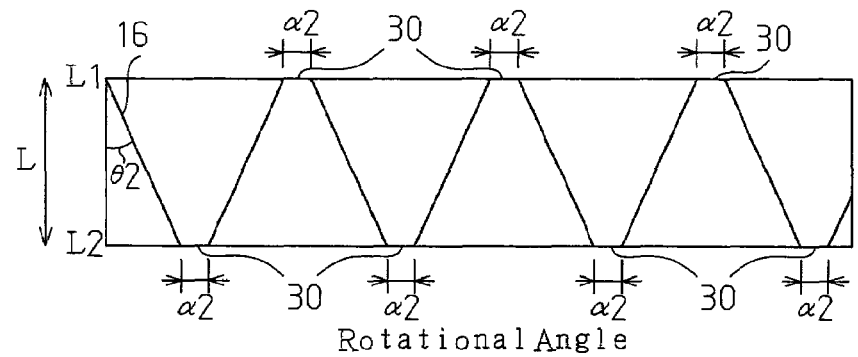
FIG. 5(b) is a diagram showing a method for forming the second pattern layer.
Figure 6:
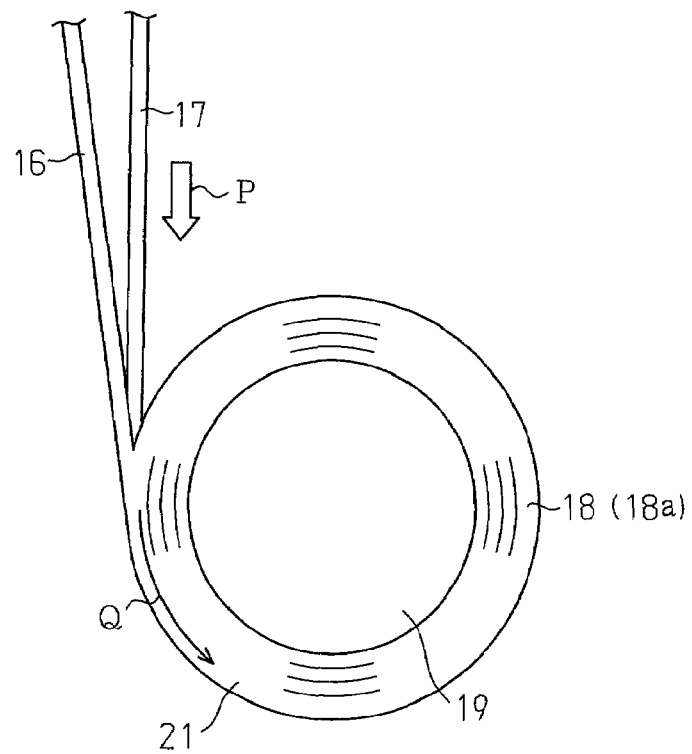
FIG. 6 is an explanatory diagram showing a state in which ceramic paper is rolled.

The manufacturing method for the filter 15 will now be described with reference to FIGS. 5(a) and 5(b) and FIG. 6.

To manufacture the cylindrical body 15a of the filter 15, a first process for forming the inner circumferential portion 21 is first performed. Then, a covering process for covering the outer circumferential surface of the inner circumferential portion 21 with the ceramic paper 17 is performed. Subsequently, a second process for forming the outer circumferential portion 22 is performed.

In the first process, a wire feed/guide tool (not shown) is moved at a uniform velocity from one winding end L1 to another winding end L2 in the axial direction of the rotating bobbin 19 while the wire feed/guide tool feeds a single wire 16. As a result, the wire 16 is wound around the outer circumference of the bobbin 19 at a predetermined winding angle θ1 with respect to an axis O of the bobbin 19 (refer to FIG. 2(a)) as shown in FIG. 5(a). "Movement of the wire 16 in the axial direction" that occurs as the wire feed/guide tool moves in the axial direction of the bobbin 19 is referred to as "feeding of the wire 16" or "traverse of the wire 16".

When the wire 16 reaches the winding end L2, the traverse of the wire 16 is temporarily stopped for a period during which the bobbin 19 rotates by a predetermined rotational angle (hereafter referred to as a first rotational angle α1). The traverse of the wire 16 is temporarily stopped in this manner so that a length of the wire 16 that corresponds to the first rotational angle α1 forms a portion extending in the circumferential direction of the cylindrical body 15a (hereafter, referred to as an adjustment portion 30) at the winding end L2.

After the adjustment portion 30 is formed, the traverse direction of the wire 16 fed by the wire feed/guide tool is reversed. The wire 16 is wound around the outer circumference of the bobbin 19 while being traversed from the winding end L2 toward the winding end L1. As a result, the wire 16 is wound in a direction in which windings of the wire 16 that are adjacent in the circumferential direction cross each other. Thus, the wire 16 is wound around the outer circumference of the bobbin 19 to form meshes. The first pattern layers 18a are formed on the outer circumference of the bobbin 19 in a manner that the mesh pitch C1 of the meshes formed by the crossing parts of the wire 16 becomes 1.3 mm by adjusting the adjustment portion 30, the winding width L, and the traverse amount of the wire 16 for each winding.

When the wire 16 reaches the winding end L1, the traverse of the wire 16 is temporarily stopped again during a period in which the bobbin 19 rotates by the first rotational angle α1. As a result, an adjustment portion 30 is formed at the winding end L1 for a length of the wire 16 corresponding to the first rotational angle α1 in the same manner as described above. Such operations are repeated so that the first one of the plurality of first pattern layers 18a is formed on the outer circumference of the bobbin 19 to have uniform meshes.

Thereafter, the operation of traversing the wire 16, temporarily stopping the traverse of the wire 16, and reversing the traverse direction at each of the winding ends L1 and L2 is repeated. As a result, the second one of the plurality of first pattern layers 18a is superimposed on the first one of the first pattern layers 18, and then the third one of the plurality of first pattern layers 18a is superimposed on the second one of the first pattern layers 18. In each first pattern layer 18a, the adjustment portions 30 are formed in predetermined cycles in the circumferential direction of the bobbin 19 at each of the winding ends L1 and L2. The relative positions of the first pattern layers 18a that are superimposed in the radial direction of the bobbin 19 are adjusted in the circumferential direction or the axial direction by adjusting the length of the adjustment portions 30 or by adjusting the traverse amount of the wire 16. More specifically, the degree of overlap of the first pattern layers 18a that are adjacent in the radial direction is adjusted by adjusting the length of the adjustment portions 30 or by adjusting the traverse amount of the wire 16. This adjusts the degree of overlap of the meshes of the first pattern layers 18a, which affects filtering capability of the filter 15 and the pressure loss that occurs in the filter 15.

A predetermined number of first pattern layers 18a are superimposed around the outer circumference of the bobbin 19 so that the cylindrical inner circumferential portion 21 is formed on the outer circumferential surface of the bobbin 19. The distance between the outer circumferential surface of the bobbin 19 and the outer circumferential surface of the inner circumferential portion 21 is set at 5 mm in the present embodiment. Next, a rolling process is performed. In the rolling process, the wire 16 is wound around the bobbin 19 while the ceramic paper 17 is placed between the wire 16 that is wound around the bobbin 19 and the outer circumferential surface of the inner circumferential portion 21 in the direction indicated by arrow P as shown in FIG. 6. Arrow Q in FIG. 6 indicates the rotation direction of the bobbin 19. This rolls the ceramic paper 17 around the bobbin 19 to cover the outer circumferential surface of the inner circumferential portion 21. At the point of time when an appropriate amount of the ceramic paper 17 is rolled around the outer circumferential surface of the inner circumferential portion 21, the setting of each manufacturing apparatus is changed to adjust the traverse amount of the wire 16 for each winding and the length of the adjustment portions 30 so that the mesh pitch C1 is reduced (more specifically the mesh pitch c1 becomes 0.9 mm).

Afterwards, the second process is performed with the changed settings. In the second process, the wire 16 is traversed in the axial direction of the rotating bobbin 19. As a result, the wire 16 is wound around the bobbin 19 while moving from one winding end L1 to the other winding end L2 on the outer circumferential surface of the ceramic paper 17 as shown in FIG. 5(b). The wire 16 is wound around the outer circumference of the bobbin 19 at a winding angle θ2 with respect to the axis O of the bobbin 19. When the wire 16 reaches the winding end L2, the traverse of the wire 16 is temporarily stopped for a period during which the bobbin 19 rotates by a predetermined rotational angle (hereafter referred to as a second rotational angle α2). The traverse of the wire 16 is temporarily stopped in this manner so that a length of the wire 16 that corresponds to the second rotational angle α1 forms an adjustment portion 30 extending in the circumferential direction of the cylindrical body 15a at the winding end L2.

After the adjustment portion 30 is formed, the traverse direction of the wire 16 that is fed by the wire feed/guide tool is reversed. The wire 16 is wound around the outer circumference of the bobbin 19 while being traversed from the winding end L2 toward the winding end L1. When the wire 16 reaches the winding end L1, the traverse of the wire 16 is temporarily stopped again during the period the bobbin 19 rotates by the second rotational angle α2. As a result, an adjustment portion 30 having a length corresponding to the second rotational angle α2 is formed at the winding end L1 in the same manner as described above. This operation is repeated so that the second pattern layer 18a, which is the first one (the outer circumferential portion 22 in the present embodiment), is formed on the outer circumferential surface of the ceramic paper 17 to have uniform meshes.

After the outer circumferential portion 22 is formed on the outer circumferential surface of the ceramic paper 17, the end (not shown) of the completely wound wire 16 is fixed to the cylindrical body 15a by performing, for example, welding. Subsequently, the cylindrical body 15a is pulled off from the bobbin 19 to obtain the cylindrical body 15a (the filter 15 before sintering). Afterwards, the cylindrical body 15a undergoes heat treatment, such as sintering, to bond the contacting points of the crossing parts of the wound wire 16. This completes the filter 15 that is in the form shown in FIG. 2(a).

The operation of the filter 15 during the generation of gas will now be described.

As shown in FIG. 1, a large amount of high-temperature, high-pressure gas generated in the chamber 13 passes through the inner circumferential portion 21 of the filter 15 from an inner side to an outer side of the filter 15 in the radial direction. The gas is sufficiently cooled when passing through the inner circumferential portion 21. As a result, liquid residues contained in the gas are solidified. In this state, since the meshes of the inner circumferential portion 21 are formed to be sufficiently large, the pressure loss of the gas that occurs when the gas passes through the inner circumferential portion 21 is small.

The gas that has passed through the inner circumferential portion 21 then passes through the ceramic paper 17. When the gas passes through the ceramic paper 17, solid residues contained in the gas (including both the above solidified residues resulting from cooling and solid residues that are originally contained in the generated gas) are captured by the pores of the ceramic paper 17. Here, the gas pressure applied to the ceramic paper 17 is received by the outer circumferential portion 22 that is arranged on the outer circumferential surface of the ceramic paper 17. Thus, the shape of the filter 15 is not changed but is maintained. Further, because the ceramic paper 17 is extremely thin, pressure loss of the gas occurring when the gas passes through the ceramic paper 17 is extremely small.

The gas that has passed through the ceramic paper 17 then passes through the outer circumferential portion 22. Because the outer circumferential portion 22 is extremely thin, pressure loss of the gas occurring when the gas passes through the outer circumferential portion 22 is extremely small. The large amount of high-pressure gas that has passed through the filter 15 is supplied into the bag.

As described in detail above, the present embodiment has the characteristics described below.

(1) The meshes of each first pattern layer 18a forming the inner circumferential portion 21 are larger than the meshes of the second pattern layer 18b forming the outer circumferential portion 22, which is at an outer side of the inner circumferential portion 21. More specifically, when the thicknesses of the inner circumferential portion 21 and the outer circumferential portion 22 in the radial direction are the same, the pressure loss of the gas is less at the inner circumferential portion 21 than the outer circumferential portion 22. Such an inner circumferential portion 21 is arranged at an inner side of the filter 15. Thus, even when the thickness M1 of the inner circumferential portion 21 in the radial direction is set to be large in order to cool a large amount of the generated high-temperature, high-pressure gas, the pressure loss of the gas is easily reduced. Further, the cooling performance is improved by increasing the thickness M1 of the inner circumferential portion 21 in the radial direction so that liquid residues contained in the gas are easily solidified when the gas passes through the inner circumferential portion 21. This improves the residue capture capability of the ceramic paper 17, which is arranged to cover the outer circumferential surface of the inner circumferential portion 21, and consequently improves the residue capture capability of the filter 15.

(2) Each second pattern layer 18b forming the outer circumferential portion 22 has a large number of fine meshes to increase the contacting points of the wire 16 per unit area. Further, the outer circumferential portion 22, which has high strength, is arranged at an outer side of the ceramic paper 17 in the filter 15. This enables the shape of the filter 15 to easily be maintained and withstand pressure that is applied to the ceramic paper 17 when the high-pressure gas passes through the ceramic paper 17.

(3) The density (bulk specific gravity) of the inner circumferential portion 21 is lower than the density (bulk specific gravity) of the outer circumferential portion 22. More specifically, when the thicknesses of the inner circumferential portion 21 and the outer circumferential portion 22 in the radial direction are the same, the pressure loss of the gas is less at the inner circumferential portion 21 than the outer circumferential portion 22. Such an inner circumferential portion 21 is arranged at an inner side in the filter 15. Thus, even when the thickness M1 of the inner circumferential portion 21 in the radial direction is set to be large in order to cool a large amount of the generated high-temperature, high-pressure gas, the pressure loss of the gas is easily reduced. Further, the cooling capability is improved by increasing the thickness M1 of the inner circumferential portion 21 in the radial direction so that liquid residues contained in the gas are easily solidified when the gas passes through the inner circumferential portion 21. This improves the residue capturing performance of the ceramic paper 17, and consequently improves the residue capture capability of the filter 15.

(4) Each second pattern layer 18b is formed to increase the contacting points of the wire 16 per unit area. Thus, the density of the outer circumferential portion 22 is high. Further, the outer circumferential portion 22 having high strength is arranged at an outer side of the ceramic paper 17 in the filter 15. This enables the shape of the filter 15 to be easily maintained and withstand the pressure that is applied to the ceramic paper 17 when the high-pressure gas passes through the ceramic paper 17.

(5) The thickness M2 of the outer circumferential portion 22 in the radial direction is set to be less than or equal to the thickness M1 of the inner circumferential portion 21 in the radial direction. More specifically, when the thicknesses of the inner circumferential portion 21 and the outer circumferential portion 22 in the radial direction are the same, the outer circumferential portion 22 increases the pressure loss of the gas as compared with the inner circumferential portion 21. Such an outer circumferential portion 22 is formed to be thin. This easily minimizes the pressure loss that occurs when the gas that has passed through the inner circumferential portion 21 and the ceramic paper 17 passes through the outer circumferential portion 22 while maintaining the shape of the filter 15.

(6) The thickness M2 of the outer circumferential portion 22 in the radial direction is extremely thin. This easily reduces the pressure loss of the gas that occurs when the gas passes through the outer circumferential portion 22. In the same manner, the thickness M3 of the ceramic paper 17 in the radial direction is extremely thin. Thus, the pressure loss of the gas that occurs when the gas passes through the ceramic paper 17 is easily reduced.

(7) The adjustment portions 30 for adjusting the positions or the shapes of the meshes of the pattern layers 18 are arranged at the winding ends L1 and L2. Thus, the first pattern layers 18a are easily superimposed upon one another while the relative positions of the meshes of each first pattern layer 18a in the circumferential direction and the axial direction of the inner circumferential portion 21 are adjusted to optimize the cooling capability, the filtering capability, and the pressure loss.

(8) The cylindrical body 15a is manufactured by winding the single wire 16 around the outer circumference of the bobbin 19 while moving the wire 16 in the axial direction of the rotating bobbin 19. The traverse amount of the wire 16, the rotational angle of the bobbin 19, etc. may be adjusted in a stepped manner or in a continuous manner. This enables the size of the meshes of the filter 15 in the present embodiment to be freely changed in the radial direction. Thus, the filter 15 is more advantageous than a filter obtained by compressing and shaping a knit mesh net that is knitted in stockinet or a filter obtained by rolling a flat-woven net into a layered cylinder.

(9) The ceramic paper 17 is rolled around the outer circumferential surface of the inner circumferential portion 21 as the bobbin 19 rotates while being held between the outer circumferential surface of the inner circumferential portion 21 and the wire 16 that is wound around the inner circumferential portion 21. In this way, the ceramic paper 17 is easily arranged between the inner circumferential portion 21 and the outer circumferential portion 22.

The above embodiment may be modified in the following forms.

A ceramic paper 17 having strength that is high enough to maintain the shape of the filter 15 and withstand the pressure applied to the ceramic paper 17 may be used. In this case, the gap pitch C2 of the outer circumferential portion 22 may be changed freely if it is less than or equal to 1.0 mm.

The bulk specific gravity of the inner circumferential portion 21 may be changed freely if it is less than or equal to 4.5 g/cm$^3$.

The thickness M2 of the outer circumferential portion 22 in the radial direction may be changed freely in a range of one to six times the thickness of the wire 16 (the thickness of the wire 16 in the radial direction of the cylindrical body 15a when the wire 16 is wound, that is, the vertical width of a rectangular wire or the diameter of a round wire).

The ceramic paper 17 may be eliminated. In this case, it is required that the meshes of the outer circumferential portion 22 be large enough to sufficiently filter solid residues. For example, the thickness M2 of the outer circumferential portion 22 in the radial direction may be set at 2.8 mm, the bulk specific gravity of the outer circumferential portion 22 may be set at 4.6 g/cm$^3$, the mesh pitch C1 of the outer circumferential portion 22 may be set at 1.0 mm, and the gap pitch C2 may be set at 0.4 mm as shown in Table 2.

TABLE 2

|  | Inner Diam. (mm) | Outer Diam. (mm) | Mesh Pitch (mm) | Bulk Specific Gravity (g/cm$^3$) | Thickness (mm) |
| --- | --- | --- | --- | --- | --- |
| Inner Circumferential Portion | 45 | 55 | 1.3 (*0.7) | 3.4 | 5 |
| Outer Circumferential Portion | 55 | 60.6 | 1.0 (*0.4) | 4.6 | 2.8 | dimension marked by * is gap pitch

In this manner, the meshes of the outer circumferential portion 22 may be finer and the thickness M2 of the outer circumferential portion 22 may be larger. In this case, the outer circumferential portion 22 captures solid residues contained in the gas in lieu of the ceramic paper 17. The filter 15 includes the outer circumferential portion 22 that is much thinner than the inner circumferential portion 21 and does not include the ceramic paper 17 having fine pores. Thus, the pressure loss of the entire filter 15 does not increase. More specifically, the shape or the thickness (volume) of the meshes of the inner circumferential portion 21 and the meshes of the outer circumferential portion 22 may be set differently in accordance with the application. Thus, even when the ceramic paper 17 is not used, it is easy for the filter 15 to have improved capability for capturing residues contained in the gas while preventing pressure loss of the gas. In this case, the thickness M2 of the outer circumferential portion 22 in the radial direction can be freely changed within a range of one to ten times the thickness of the wire 16.

The outer circumferential portion 22 may be formed by superimposing a plurality of second pattern layers 18b.

In the above embodiment, the wire feed/guide tool is moved in the axial direction of the rotating bobbin 19 when the wire 16 is wound around the bobbin 19. Instead of moving the wire feed/guide tool, the bobbin 19 may be moved in the axial direction to wind the wire 16 and manufacture the cylindrical body 15a.

The adjustment portion 30 formed in at least one of the winding end L1 and the winding end L2 may be eliminated. For example, adjustment portions 30 may be formed only at one of the winding ends L1 and L2 of the filter 15 or may be formed at any position between the winding ends L1 and L2 of the filter 15. When adjustment portions 30 are formed at any position between the winding ends L1 and L2 of the filter 15, an adjustment portion 30 may first be formed at one of the winding ends L1 and L2. Then, before an adjustment portion 30 is formed at the other one of the winding ends L1 and L2, a further adjustment portion 30 may be formed without reversing the traverse direction of the wire 16.

The specifications of the filter 15 (wire 16 etc.) including its dimensions may be appropriately determined in accordance with the shape and the size of the inflator 10 in which the filter 15 is set. Further, the material for the wire 16 may be freely changed to, for example, soft steel, stainless steel, nickel alloy, or copper alloy.

The knitting method of the cylindrical body 15a may be changed to any method other than the method of crossing the wire 16 and forming diamond-shaped meshes.

Wires that differ in material or shape may be used to form the inner circumferential portion 21 and the outer circumferential portion 22. For example, when a thicker wire is used to form the outer circumferential portion 22, the contact area of the wire increases and consequently the area of the joined parts increases. In this case, the strength of the outer circumferential portion 22 increases.

The second pattern layers 18b of the outer circumferential portion 22 may be formed without crossing the wire 16 if the second pattern layers 18 have a sufficient strength. More specifically, the wire 16 does not have to be crossed and may simply be wound around the outer circumferential surface of the ceramic paper 17.

The invention claimed is:

1. An inflator filter member for filtering and cooling gas by passing the gas therethrough, the inflator filter member comprising:
   wire wound into a cylindrical body, the cylindrical body including a cylindrical inner circumferential portion having an outer circumferential surface, and a cylindrical outer circumferential portion covering an outer circumferential surface of the inner circumferential portion;
   the inner circumferential portion being formed of a superimposition of a plurality of first pattern layers in the radial direction, and the outer circumferential portion being formed of a superimposition of one or more second pattern layers in the radial direction on the outer circumferential surface of the inner circumferential portion; and
   the first pattern layers and the second pattern layers each being formed from the wire to have a mesh, with the mesh of each second pattern layer being smaller than the mesh of each first pattern layer,
   wherein a sheet filter member is arranged to cover the outer circumferential surface of the inner circumferential portion, and the outer circumferential portion is arranged to cover an outer circumferential surface of the sheet filter member, with the sheet filter member having pores that are finer than the mesh of each of the first pattern layers.

2. The inflator filter member according to claim 1, wherein in each of the second pattern layers, a gap between adjacent turns of the wire is 1 mm or less.

3. The inflator filter member according to claim 1, wherein the wire in each of the second pattern layers has a density that is greater than that of the wire in each of the first pattern layers.

4. The inflator filter member according to claim 3 wherein the inner circumferential portion has a bulk specific gravity of 4.5 g/cm$^3$ or less.

5. The inflator filter member according to claim 1, wherein the outer circumferential portion has a thickness in the radial direction that is less than or equal to the thickness of the inner circumferential portion in the radial direction.

6. The inflator filter member according to claim 1, wherein the outer circumferential portion has a thickness in the radial direction that is one to ten times the thickness of the wire.

7. An inflator filter member for filtering and cooling gas by passing the gas therethrough, the inflator filter member comprising:
   wire wound into a cylindrical body, the cylindrical body including a cylindrical inner circumferential portion having an outer circumferential surface, and a cylindrical outer circumferential portion covering an outer circumferential surface of the inner circumferential portion;
   the inner circumferential portion being formed of a superimposition of a plurality of first pattern layers in the radial direction, and the outer circumferential portion beina formed of a superimposition of one or more second pattern layers in the radial direction on the outer circumferential surface of the inner circumferential portion; and
   the first pattern layers and the second pattern layers each being formed from the wire to have a mesh with the mesh of each second pattern layer being smaller than the mesh of each first pattern layer,
   wherein the cylindrical body includes an adjustment portion formed by part of the wire and extending in a circumferential direction of the cylindrical body.

8. The inflator filter member according to claim 7, wherein the wire in each of the second pattern layers has a density that is greater than that of the wire in each of the first pattern layers.

9. The inflator filter member according to claim 7, wherein the outer circumferential portion has a thickness in the radial direction that is less than or equal to the thickness of the inner circumferential portion in the radial direction.

10. A method for manufacturing an inflator filter member for filtering and cooling gas by passing the gas therethrough, the method comprising:
    winding a wire around an outer circumferential surface of a shaft member to form a first pattern layer having a mesh on the outer circumferential surface of the shaft member and superimposing a plurality of the first pattern layers in the radial direction of the shaft member to form an inner circumferential portion; and winding the wire around the outer circumferential surface of the inner circumferential portion to superimpose on the outer circumferential surface of the inner circumferential portion a second pattern layer having a mesh that is smaller than the mesh of each first pattern layer; and rolling a sheet filter member having pores that are finer than the mesh of the first pattern layers around the outer circumferential surface of the inner circumferential portion and then winding the wire wound around an outer circumferential surface of the sheet filter member, in which said rolling is performed after said winding a wire around an outer circumferential surface of the shaft member and before said winding the wire around the outer circumferential surface of the inner circumferential portion.

11. The method according to claim 10, wherein the wire is wound so that the outer circumferential portion has a thickness in a radial direction that is equal to or less than the thickness of the inner circumferential portion in the radial direction.

12. A method for manufacturing an inflator filter member for filtering and cooling gas by passing the gas therethrough, the method comprising:

winding a wire wound around an outer circumferential surface of a shaft member to form a first pattern layer having a mesh on the outer circumferential surface of the shaft member and superimposing a plurality of the first pattern layers in the radial direction of the shaft member to form an inner circumferential portion;

winding the wire around the outer circumferential surface of the inner circumferential portion to superimpose on the outer circumferential surface of the inner circumferential portion a second pattern layer in which the wire has a density that is greater than that of the wire in the first pattern layer; and rolling a sheet filter member having pores that are finer than the mesh of the first pattern layers around the outer circumferential surface of the inner circumferential portion and then winding the wire wound around an outer circumferential surface of the sheet filter member, in which said rolling is performed after said winding a wire around an outer circumferential surface of the shaft member and before said winding the wire around the outer circumferential surface of the inner circumferential portion.

13. The method according to claim 12, wherein the wire is wound so that the outer circumferential portion has a thickness in a radial direction that is equal to or less than the thickness of the inner circumferential portion in the radial direction.

14. The manufacturing method for the inflator filter member according to claim 13, further comprising rolling a sheet filter member having pores that are finer than the mesh of the first pattern layers around the outer circumferential surface of the inner circumferential portion and then winding the wire wound around an outer circumferential surface of the sheet filter member, in which said rolling is performed after said winding a wire around an outer circumferential surface of a shaft member and before said winding the wire-around the outer circumferential surface of the inner circumferential portion.

15. The method for manufacturing the inflator filter member according to claim 13, wherein at least one of said winding the wire includes winding the wire in a circumferential direction of the cylindrical body to form an adjustment portion for adjusting an amount of overlap of the pattern layers that are adjacent in the radial direction of the shaft member.

16. The manufacturing method for the inflator filter member according to claim 12, further comprising rolling a sheet filter member having pores that are finer than the mesh of the first pattern layers around the outer circumferential surface of the inner circumferential portion and then winding the wire wound around an outer circumferential surface of the sheet filter member, in which said rolling is performed after said winding a wire around an outer circumferential surface of a shaft member and before said winding the wire around the outer circumferential surface of the inner circumferential portion.

17. The method for manufacturing the inflator filter member according to claim 12, wherein at least one of said winding the wire includes winding the wire in a circumferential direction of the cylindrical body to form an adjustment portion for adjusting an amount of overlap of the pattern layers that are adjacent in the radial direction of the shaft member.

18. A method for manufacturing an inflator filter member for filtering and cooling gas by passing the gas therethrough, the method comprising:

winding a wire around an outer circumferential surface of a shaft member to form a first pattern layer having a mesh and superimposing a plurality of the first pattern layers in the radial direction of the shaft member to form an inner circumferential portion;

winding the wire around the outer circumferential surface of the inner circumferential portion to superimpose on the outer circumferential surface of the inner circumferential portion a second pattern layer having a mesh that is smaller than the mesh of the first pattern layer; and wherein at least one of said winging the wire includes winding the wire in a circumferential direction of the cylindrical body to form an adjustment portion for adjusting an amount of overlap of the pattern layers that are adjacent in the radial direction of the shaft member.

19. A method for manufacturing an inflator filter member for filtering and cooling gas by passing the gas therethrough, the method comprising:

winding a wire wound around an outer circumferential surface of a shaft member to form a first pattern layer having a mesh an the outer circumferential surface of the shaft member and superimposing a plurality of the first pattern layers in the radial direction of the shaft member to form an inner circumferential portion;

winding the wire around the outer circumferential surface of the inner circumferential portion to superimpose on the outer circumferential surface of the inner circumferential portion a second pattern layer in which the wire has a density that is greater than that of the wire in the first pattern layer; and wherein at least one of said winding the wire includes winding the wire in a circumferential direction of the cylindrical body to form an adjustment portion for adjusting an amount of overlap of the pattern layers that are adjacentin the radial direction of the shaft member.

* * * * *